United States Patent [19]
Kwasie

[11] Patent Number: 5,462,206
[45] Date of Patent: Oct. 31, 1995

[54] MELTING ASSEMBLY FOR THERMOPLASTIC MATERIALS

[76] Inventor: Jon B. Kwasie, 6 Highwood Rd., Manchester, Mass. 01944

[21] Appl. No.: 322,003

[22] Filed: Oct. 12, 1994

[51] Int. Cl.⁶ ..................................................... B07D 5/62
[52] U.S. Cl. ............................................................ 222/146.5
[58] Field of Search ........................................... 222/146.5

[56] References Cited

U.S. PATENT DOCUMENTS

| | | | |
|---|---|---|---|
| 2,389,686 | 11/1945 | Reingruber et al. | 200/137 |
| 3,743,142 | 7/1973 | Elliott et al. | 222/146.5 |
| 4,059,204 | 11/1977 | Duncan et al. | 222/146.5 |
| 4,090,643 | 5/1978 | Wilkinson, Jr. et al. | 222/146.5 |
| 4,352,442 | 10/1982 | Leibhard et al. | 222/146.5 |
| 4,379,516 | 4/1983 | Barlogis | 222/146.5 |
| 4,463,516 | 8/1984 | Mazzarella | 46/320 |
| 4,523,705 | 6/1985 | Belanger et al. | 222/146.5 |
| 4,637,745 | 1/1987 | Speisebecher et al. | 222/146.5 |
| 4,664,296 | 5/1987 | Dziki | 222/146.5 |
| 4,774,123 | 9/1988 | Dziki | 222/146.5 |
| 4,948,944 | 8/1990 | Oster | 222/146.5 |
| 4,951,846 | 8/1990 | Oster et al. | 222/146.5 |
| 4,953,755 | 9/1990 | Dennison | 222/146.5 |
| 4,986,680 | 1/1991 | Melendy | 222/146.5 |
| 5,041,482 | 8/1991 | Omsteen et al. | 524/272 |

FOREIGN PATENT DOCUMENTS

| | | |
|---|---|---|
| 0380420 | 1/1990 | European Pat. Off. ............. 222/146.5 |
| 1402648 | 8/1971 | United Kingdom . |
| 1562926 | 8/1976 | United Kingdom . |
| 1540482 | 2/1979 | United Kingdom . |

OTHER PUBLICATIONS

"Cartridge Heaters: Superwatt" Manufacture's spec. sheet (Hotwatt).
"The Model B-200 Conduction Type Thermostat" from Bilbee Controls Inc., N.Y., N.Y.

Primary Examiner—Andres Kashnikow
Assistant Examiner—Kenneth Bomberg
Attorney, Agent, or Firm—Vidas, Arrett & Steinkraus

[57] ABSTRACT

A new and improved melt housing chamber arrangement for hot melt glue guns and the like.

16 Claims, 6 Drawing Sheets

MELTING ASSEMBLY FOR THERMOPLASTIC MATERIALS

BACKGROUND OF THE INVENTION

The invention is concerned with the field of "melt applicators" or "melt dispensers". While most of the prior art (referenced herein) tends to focus upon the use of these applicators for the melting of adhesives, it is not my intention to limit the scope of this invention to that purpose alone as it is applicable to the dispensing of any thermoplastic material. Broadly, the invention relates to new and improved melting chambers for such dispensers.

Any "melt applicator", "melt dispenser", "glue gun", "adhesive dispenser", etc., can be functionally divided into at least three groupings of components:

(1) A melt assembly or melting assembly consisting of a thermally conductive housing (referred to herein as a "melt housing") having an internal melting chamber; a means for heating; a means for controlling or regulating heating temperature (in some prior art this may be integral to the heating means); necessary wires or wiring to connect the electrical components to one another and to supply electrical energy for operation; a conduit means which allows for the introduction of the thermoplastic material into the melt housing (referred to as an "inlet tube", "guide tube", "feed tube" or "feeding tube"); a means for attaching the inlet tube; an exit or outlet means having features to attach or affix a nozzle or valve or similar device to limit, direct or control the flow of the thermoplastic materials. For present purposes, this grouping of parts is referred to as the "melt assembly" or "melting assembly".

(2) A feed means for advancing the thermoplastic material(s) into the above melting assembly. In its simplest form it could be the thumb or other finger of the operator applying force directly to the material itself. More commonly it involves some mechanism which, when external force is applied, grips, grabs or engages the material to be melted and then advances it forward into the melt assembly. This force may be from manual actuation or hand pressure; mechanical, hydraulic or pneumatic pressure; electrical or motor-drive means; or any combination or other method thereof.

(3) A means for locating, retaining and protecting the above elements (and the operator) and also including one or more of the following: handle or handles, outer casing(s), or housing; electrical power supply cables, wires, and/or connections; pneumatic or hydraulic supply lines and/or connections; spacers; insulators; fasteners; vents or venting, and the like.

This invention is concerned primarily with a unique and synergistic grouping of certain parts, materials and/or features which are located within the first grouping of elements or the "melting assembly" as described above, and which offer distinct and specific advantages over the prior art.

U.S. Pat. No. 4,637,745 to Speisebecher et al., dated Jan. 20, 1987, entitled "MELT DISPENSERS" is of interest for background, primarily because of its discussion and description of "fins" and/or "fin elements" as used in the device's melt chamber. The fin elements and "sub-elements" are numerous and complex.

Great Britain Patent Specification No. 1,402,648, published Aug. 13, 1975, entitled "IMPROVEMENTS IN OR RELATING TO APPARATUS FOR DISPENSING MOLTEN THERMOPLASTIC COMPOSITIONS" is of interest in several areas:

(1) It describes a melt chamber which is "substantially W or V-shaped in cross-section"; though it fails to specifically describe or place numerical values or numerical/dimensional relationships in its description. What might be considered as fin elements in this patent are only referred to as "undulations" or as an "undulatory perimeter". The undulations are not pronounced and, not "bladelike" enough to be effective at penetrating and melting the thermoplastic material.

(2) It describes how a "thermostat unit controls the heater to maintain the temperature of material in the melting chamber at a desired level", but fails to be more specific as to the type of thermostat, type of heater (other than as generally described as an "electrical cartridge heater"), place any numerical values as to their performance ranges, temperature ranges, etc. The only temperature value shown in the complete specification is 400° F.

U.S. Pat. No. 4,059,204 to Duncan et al., issued Nov. 22, 1977, entitled "SYSTEM FOR DISPENSING AND CONTROLLING THE TEMPERATURE OF HOT MELT ADHESIVE" is of interest in several areas.

(1) Electronic circuitry is utilized so that a given selected temperature setpoint "is automatically raised a predetermined amount when the glue is flowing in order to compensate for the drop in temperature caused by the loss of heat to the glue and atmosphere". Reference is made to the effect that "the operator can set a desired temperature to which the glue is heated", but no numerical values are given as to temperature values. The patent appears to indicate a range in excess of 340° F.

(2) A useful numerical value of 60° F. is shown as the value of temperature differential between the melt chamber and the glue when the latter is flowing through the melt chamber without the electronic compensating circuit.

(3) The use of standard cartridge heaters is indicated. Great Britain patent specification No. 1,562,926, published Mar. 19, 1980, entitled "IMPROVEMENTS IN OR RELATING TO APPARATUS FOR MELTING AND DISPENSING THERMOPLASTICS MATERIAL AND METHODS OF MAKING SUCH APPARATUS" is included because the apparatus in the patent uses what is described as an "electric heater" and "a thermostat".

European patent application No. 90400216.9, publication No. 0 380 420 A2, applicant/inventor Peter S. Melendy, entitled GLUE STICK AND APPLICATOR", date of filing Jan. 24, 1990 describes a glue stick, specifically having an oval cross-sectional shape. In addition, it includes a glue applicator for using said glue sticks. The application suggests that only the inlet portion of the heating (melting) chamber needs to substantially resemble the glue stick, and that it can "taper from said acircular inlet to a portion having a circular transverse cross-section". The present invention uses a similar design concept by allowing for the inlet port to be capable of accepting alternate cross-sectional perimeters/shapes.

U.S. Pat. No. 4,774,123 to Michael M. Dziki, issued Sep. 27, 1988, entitled "THERMOPLASTIC BLOCK SHAPE AND MANUFACTURING METHOD" demonstrates alternative embodiments of thermoplastic materials having different and/or alternating cross-sectional shapes.

U.S. Pat. No. 5,041,482 to Robert L. Ornsteen et al., issued Aug. 20, 1991, entitled "COOL MELT GLUE" is informative regarding the preferred temperature ranges of prior art thermoplastic materials and application equipment.

U.S. Pat. No. 4,523,705 to Richard W. Belanger et al., issued Jun. 18, 1985, entitled "MECHANISM FOR GLUE GUN" deals with the issue of "excessive force" as it applies to the use and operation of glue guns. The excessive force is usually applied when the user of the gun attempts to force cold glue through a heating chamber which has not been given adequate time to reach the optimum temperature for operation of the gun. The solution offered by this patent suggests the use of spring features or mechanical fuse features to compensate for the excessive force applied.

The solution offered by the present invention is different. By providing a combination of improved heating and temperature control, in conjunction with an improved design to the melting chamber, the time to reach optimum temperature for operation of the gun or what is referred to herein as "recovery time" is significantly reduced. The issue of "excessive force" is thereby obviated.

U.S. Pat. No. 2,389,686 to F. Reingruber et al., issued Nov. 27, 1945, entitled "THERMOSTAT" relates to a surface mounted expansion/conduction type of thermostat as is preferred for this invention.

SOME COMMERCIALLY AVAILABLE GLUE GUNS

3M Company Model "HP" Applicator: This tool has an adjustable temperature feature which offers 7 specific temperatures which are user selectable by changing switch settings on an external (to the gun) controller module/transformer located at the plug end of the electrical cord. The temperature sensing device is a thermistor which is located between the product's two cartridge heaters, all located on the same side of the melting chamber.

Sofragraf Model HM-318 (Terrell/Terlan Model TMA-100); and Sofragraf Model PAC-318 (Terrell/Terlan Model TMA-101, and H. B. Fuller Model TMA-101) [Manufactured by Sofragraf Industries, St. Ame, FRANCE]. This family of tools uses adjustable temperature thermostats which have an adjustable range from 350° F. to 450° F. via an adjustment knob attached directly to the thermostat. The specific type of thermostat having bimetallic sensing elements, is not the preferred expansion/conduction type used in the present invention. The applicator has mechanical "stops" to limit the travel of the knob such that the minimum or maximum setting would not be exceeded. This model dates back to 1979–1980 period.

Sofragraf Model HM-112 (Terrell/Terlan Model TM-80); Sofragraf Model HM-114, HM-115, (include Regal R-1200X); Sofragraf Model PAC-113 (H. B. Fuller Model TM-81). All of these guns use thermostats having bi-metallic sensing elements.

Hysol Model 2000, currently manufactured by Dexter-Hysol Corp. This gun does not use a thermostat, but rather an electronic circuit with a thermistor sensor to control the 100 W heating element. There is a potentiometer device to adjust the temperature but it is very sensitive and small increments of adjustment result in large temperature shifts. There do not appear to be any upper or lower "stop" features to limit the amount of adjustment. This general method is of temperature control is very accurate and when the gun is idling the idle temperature range stays within a narrow band of approximately 10° F. Unfortunately, once dynamic load conditions begin (i.e., material is dispensed), the temperature drops significantly.

A.M.C. (Adhesive Machinery Corporation of Seabrook, N.H.) Model #275HS. This tool has a small dial thermometer located near the outlet port of a melting chamber. This is a prior-art concept of a "temperature reference point". (No longer commercially available.)

A.M.C. (Adhesive Machinery Corporation of Seabrook, N.H) Model #350P, model name "Hipermatic 2.5". This model had an external control box which allows for switching between a regular application temperature in the 380°–400° F. range, and a "Standby" setting at or below 275° F. It was later superseded by the Model "SST-1" which had the switching features inside the gun itself. (No longer commercially available.)

SUMMARY OF THE INVENTION

This invention offers improved performance in the melting of thermoplastic materials (including but not limited to adhesives) and is primarily for use in what may be referred to in the art as a "glue applicator", "melt dispenser", "hot melt gun", "melt applicator", "glue gun", etc. It is important to note that this invention does not center on a complete glue gun or the like, but rather relates to the major component assembly used in these applicators for the heating, melting, homogenization and temperature regulation of the thermoplastic material(s) i.e., a melt assembly or melt housing. As such, it may be incorporated into any dispenser/applicator design, many of which are already known in the art.

Using hot-melt adhesives in the 370°–400° F. range, this invention in a glue gun or the like provides highly improved melting rates, roughly 0.100 lbs/minute (45 grams/minute) with an effective yield of 6 lbs/hour using cylindrical 11–12 mm diameter thermoplastic rods and it maintains similarly consistent melting output regardless of whether it is the first minute or any consecutive minute thereafter. This melting rate is roughly twice the 20–24 grams/minute as referenced in U.S. Pat. No. 4,637,745 (Spiesbecher et al.).

This invention solves a previously unrecognized problem insofar as it is capable of less variation in melting output between dense and/or high viscosity materials as compared with less dense and/or lower viscosity materials. Previous devices have shown a notable decrease in melting output with higher viscosity and/or denser materials. This output is measured in terms of weight over time, usually pounds/hour, pounds/minute or grams/minute. This was a new and unexpected result of the development of the invention for glue guns and was first recognized during the first tests completed on a glue gun incorporating the invention.

In most developmental embodiments of glue guns incorporating this invention it has offered a feature for temperature adjustability in any range from ambient (70° F.) to a theoretical maximum of 600° F. In its initial commercial embodiment it is expected to operate in a user selectable temperature range from a minimum adjustment of 210° F. to a maximum adjustment of 410° F. The thermostat will be equipped with "stop mechanism" feature or features which will act to prevent the user from exceeding either the lower (minimum) or the upper (maximum) temperature limits. The combination of this wide a temperature range in conjunction with such "stops" is a novel improvement over the prior art, and I believe has never before been claimed for similar devices using thermostats.

In its most preferred embodiment, the invention provides a feature referred to herein as "temperature reference point" or "temperature standard location". It consists of a threaded or non-threaded cavity or indentation located at or near the invention's outlet port and provides a common reference point for temperature measurement during manufacture, calibration, field diagnosis, service and repair.

The invention's melting blade features are improvements over prior art elements shown as "fin elements" in U.S. Pat. No. 4,637,745, and the "undulations" as shown in Great Britain patent specification No. 1,402,648.

The "fin elements" shown in the U.S. patent are somewhat similar to the extent that they are substantially triangular and situated longitudinally along a melting axis with the small "ends" nearer to the inlet end of the melting chamber, progressively increasing in height as they approach the outlet port of the melting chamber. The improvements over the U.S. patent in the fins/blades include but are not limited to:

(1) The present invention utilizes fewer blades in a far simpler configuration and the blades used in this invention do not connect with one another inside the melting chamber but are located substantially parallel to, and in-between one another. This allows for less complex tooling and potentially more reliable manufacturability.

(2) The lengths, angles, geometry, or distance from either of the ports of the individual blades themselves are deliberately different so that not more that two blades will have the same physical geometry, or if they do, no more than two blades will be equidistant from the inlet port. This longitudinal "staggering" of the blades is most critical because it allows for the material passing through the melting chamber to be sequentially and gradually "bifurcated" or "trifurcated" into ever smaller or thinner streams or substreams; this improvement lessens the "stalling effect" or "hesitation" experienced by operators during the dispensing of thermoplastic materials. This effect is the result of the depletion of a surplus reservoir of molten material which forms when a melting assembly is heated but not used for dispensing. Once dispensing begins or resumes and this reservoir depletes, there can be a subsequent inability of the heating and temperature control to "keep up with" new and relatively colder material as it is introduced and advanced through the melting chamber. This is frequently misinterpreted by users or operators as a malfunction, performance shortcoming or failure and has been the focus of other prior art, patents, etc.

(3) There is no specific description in U.S. Pat. No. 4,637,745 regarding the importance of having at least one such blade to bisect, intersect, and extend through and beyond the centerline axis of the melting chamber. This feature alone ensures that the relatively cool center of the material passing through the melt chamber gets more properly heated and homogenized with the relatively hotter material around it.

(4) The present invention's method(s) of heating and temperature control are wholly different and improved, and offer improved performance at user adjustable temperatures.

(5) There is no specific description as to any preferred height of any blade in U.S. Pat. No. 4,637,745.

Some of the improvements over the Great Britain specification (No. 1,402,648) "undulations" are that the blades in the invention are thinner, sharper and more "knifelike", more pronounced, and they protrude substantially further transversely or upwardly and across the melting chamber when viewed in cross-section. These are improvements because they offer better penetration and melting of the thermoplastic materials as it is advanced through the melting chamber.

When the present invention is fitted into a hand-powered application device, less hand force will be required to dispense molten material. This will result in less hand fatigue and/or stress to operators of the equipment this invention would be used in.

DETAILED DESCRIPTION OF THE INVENTION

Figure 1:
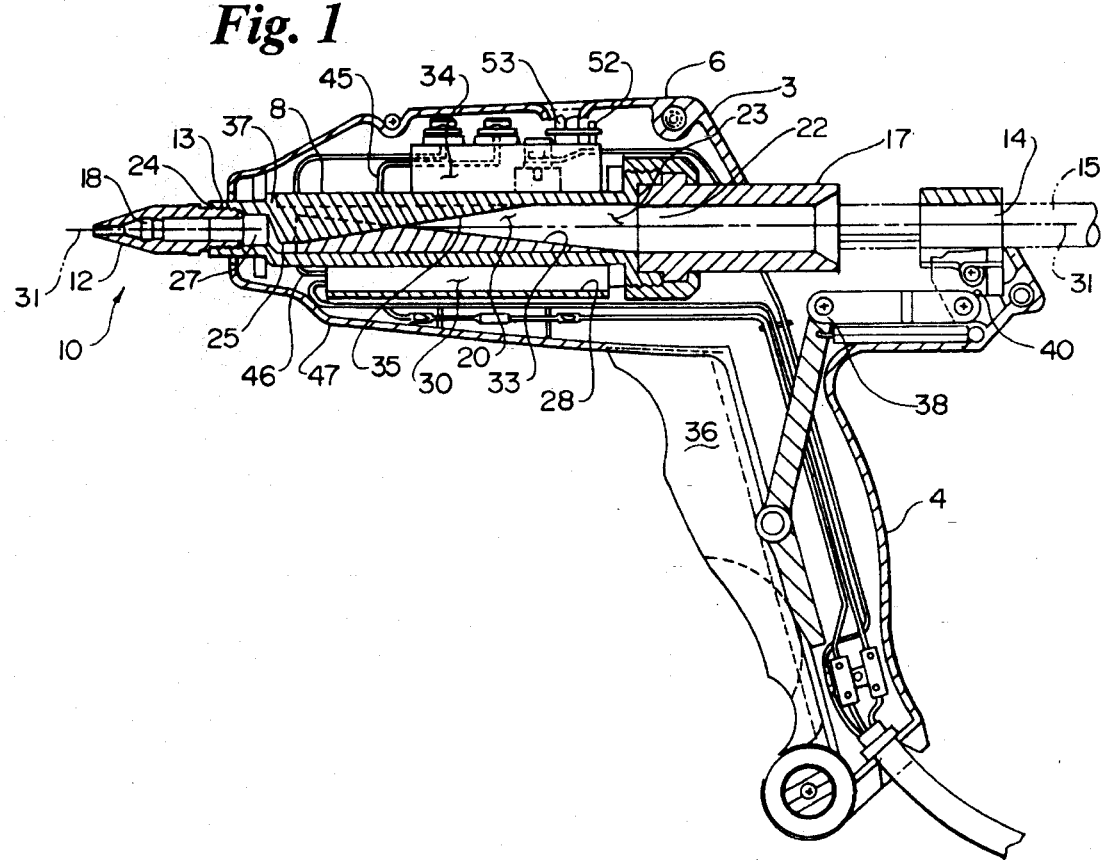
FIG. 1 is a sectional view of a typical application gun with parts cut-away incorporating the invention.

An illustrative glue gun, dispenser or applicator device typical of the prior art is illustrated in FIG. 1 as a hand-held dispenser suitable for use in melting and dispensing hot melt adhesive compositions supplied in rod form. This device is more or less typical of those known in the art which may make use of the new and improved melt housing of this invention. Other designs will also use this invention to advantage.

The device has a generally handgun-shaped housing 3 with a grip portion 4, which can be conveniently hand-held by a operator, and a barrel portion 6 houses a chamber body 8 in which a melt housing chamber 20 is provided. The chamber body 8 projects forwardly from the barrel portion 6, as shown generally at 10, and a nozzle member 12 is threaded in a tapped bore in a projecting forward end portion of the chamber body. At a rearward end portion of the hand gun shaped housing 3, a passageway is provided through which a rod 15 of solid hot melt adhesive can be fed. A rearward inlet, end portion of chamber body 8 provides an inlet opening 22 adjacent which is mounted an inlet sealing member 61 and in the form of tubular sleeve element or guide tube 17 which functions to guide the rod 15 through the inlet opening 22 into the melt housing chamber 20.

As seen in FIG. 1, an elongate melt housing chamber 20 is provided with a first portion 23 commencing at the inlet opening 22, and a second portion 25 terminating at outlet opening 24. Chamber body 8 may, for example be made of aluminum. Housing 3 may, for example, be of plastic.

Proximate inlet opening 22 of melt housing chamber 20, the first portion 23 of the melt housing has a cross-sectional slope defined by, for example, a circular perimeter of substantially the same shape and diameter as the rod 15 (so that it has the same cross-sectional shape as the circular rod for example).

Figure 6:
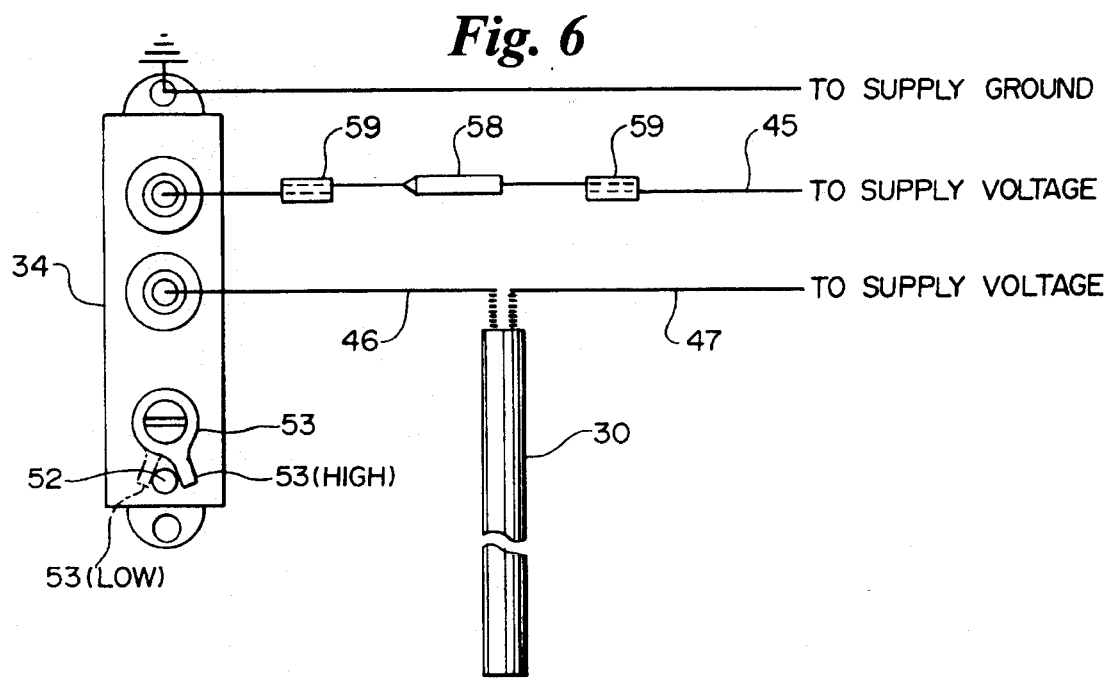
FIG. 6 is an electrical schematic for use with the invention.

Chamber body 8 provides a bore 28 for containing a heating means for heating thermoplastic material in the melt housing, in the form of an electrical heater element 30 connected by leads 46 and 47, as shown in FIG. 6, to thermostat 34 and to an electrical power source, respectively. A thermostat unit 34 controls heater 30 to maintain the temperature of material in melt housing chamber 20 at a desired level. A third lead 45 extends from thermostat 34 to a power source also.

In operation of the illustrative apparatus the adhesive material or other thermoplastic material of rod 15 is sufficiently soft by the time it reaches region 25 for it to be easily deformed as it progresses through and beyond region 25. The material then, having passed through the second portion of the melt housing, can be dispensed molten through nozzle 12 with operation by the operator of a feed means whereby pressure developed in the melt housing by the advance of the rod 15 causes molten material to be expelled through the nozzle member.

The feed means may be comprised of a trigger 36 connected through mechanical linkage generally indicated at 38 to one or more gripping elements 40 or the like. Actuation of trigger 36 causes gripping element 40, which engages rod 15, to move to the left in FIG. 1 thus advancing rod 15 into and through melt housing chamber 20.

MELT HOUSING: General Features

Figure 2:
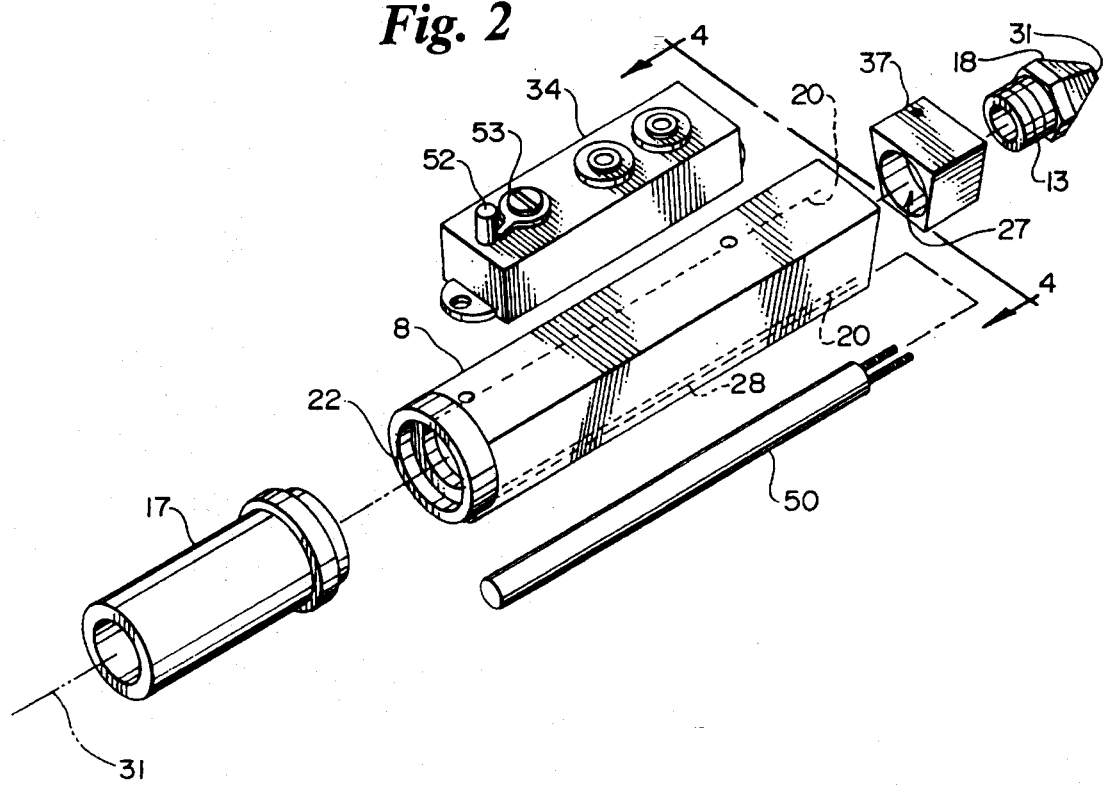
FIG. 2 is an exploded isometric view of the melt housing and chamber of the invention, which may be incorporated into an application gun such as that shown in FIG. 1, FIG. 2 showing both external features and/or components of the invention.

Referring now to FIGS. 2 and subsequent, the heart of this invention will be seen to be the melt housing chamber body 8 and chamber 20 and its arrangement. It is fabricated from a lightweight, thermally conductive material and it is generally longer in overall length than in either height or width. Within melt housing body 8 is located the substantially centrally located cavity known as a "melt chamber" or "melting chamber" 20. At one end melt chamber 20 has an "inlet port" generally indicated at 22 which may either be an integral feature of the melt housing or a separate part which has been attached or joined by any means to ensure no leakage of material at the joint during operation. At the other end of the melt housing is an "outlet port", generally indicated at 27, which, in a preferred embodiment is an integral part of the melt housing but may also be a separate part as shown and which is attached or joined by any means to ensure adequate heat transfer without material leakage. In the FIGS. 2 and 3 outlet port 27 has been shown as non-integral to the melt-housing body 8 for illustrative purposes. These three features i.e., chamber 20, inlet port 22 and outlet port 27 substantially share the same longitudinal centerline or what is also referred to as a "melt axis" or "melting axis" 31 (shown in FIGS. 1 and 2).

Figure 3:
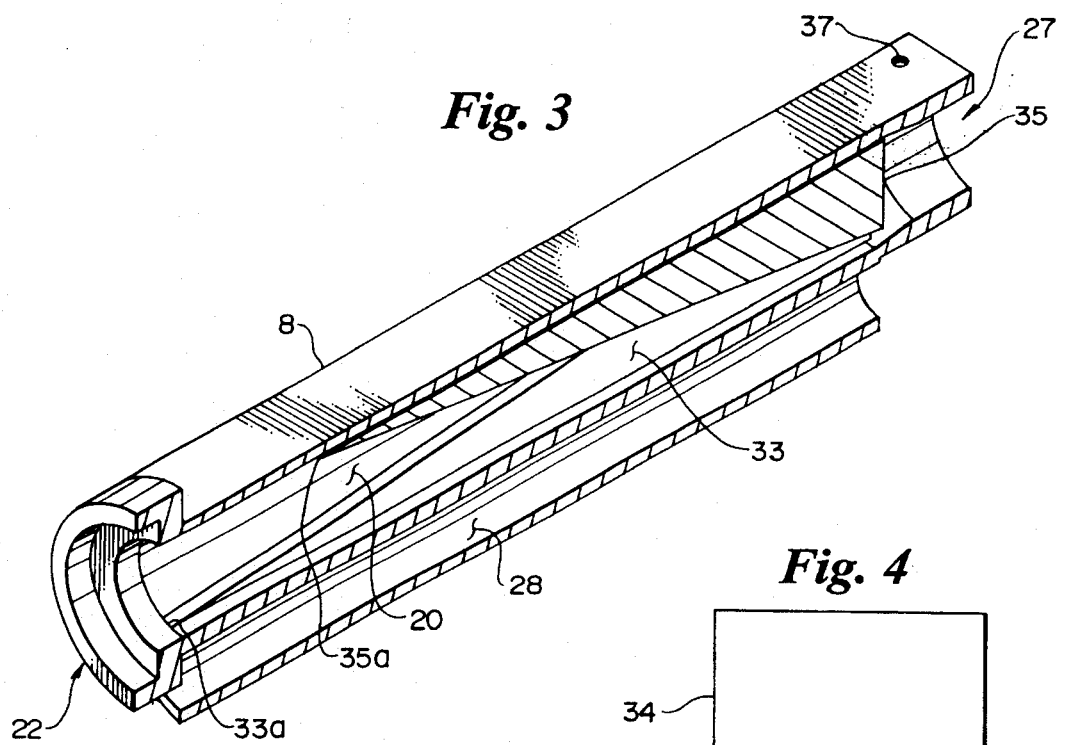
FIG. 3 is an isometric sectional view of the invention's melt-housing with parts cut-away, showing some of the internal features not readily shown in FIG. 2.

Integrally part of the melt housing 8 and protruding into the melt chamber 20 are a plurality of melting blades 33 and 35 (shown best in FIG. 3). Thermoplastic materials are introduced into the melt housing—via a means of externally applied force—usually through some attached feature or means known as an "inlet tube" or "feed tube" such as feed tube 17, and into and through its inlet port 22. The materials then pass into and through the melting chamber 20 where they are heated and homogenized by the melting blades 33 and 35 into a more uniform consistency. It is not a critical feature that the cross-sectional shape (exclusive of the blade features) of the melting chamber resembles the crosssectional perimeter of the material(s) i.e., the rod being melted. Two examples of cross-sectional shapes are shown: "round" in FIG. 4 for example, and "angular"in FIGS. 8 and 9. The molten material(s) exit the melting chamber and pass into and through the outlet port 27. The outlet port usually has some means 13 (seen in FIGS. 1 and 2) for attaching or integrally inserting some form of check-valve or nozzle valve 18 to minimize any amount of unwanted leakage of the molten material when its flow has been interrupted by a decrease or cessation of the externally applied force. The melt housing body 8 has attached to it as by screws or the like a surface mounted thermostatic assembly 34, a closely toleranced cavity 28 for an insertion type of heating device 30, and an integral feature referred to herein as a temperature reference point 37 located on an external surface near the outlet port 27 and consisting of a threaded and/or non-threaded indentation for the express purpose of inserting, attaching or affixing a temperature measurement device. This latter feature is intended to provide a common reference point in the manufacture, calibration, field-service diagnosis, repair and maintenance of units of the invention.

MELT HOUSING: "Melt Blades"

Integrally part of the melt housing 8 are a plurality of melt blades 33 and 35 which protrude from the inner wall(s) or of melt housing chamber 20. These blades are designed to progressively and sequentially slice into and melt the thermoplastic material after it has been advanced through the inlet port. There are at least two general types of blades used: One or two "primary blades" 33L, 33R (L=left and R=right) (See FIGS. 1, 3, 4, 5, 7, 10, 11, 12 and 13) which are joined to the inner wall of the melting chamber most adjacent to the heating source 30 and which are the longest (length) blades to be found within the melting chamber; and one or two "secondary blades" 35 which are shorter in length and located (in a preferred orientation) generally parallel to the primary blade or blades, and in the most preferred embodiment protrude from the opposite inner wall of the melting chamber most adjacent to the thermostatic or temperature control device 34. (See FIGS. 10 and 11.) There may be one or more "tertiary blades" 39L, 39R which are shorter in length than either the primary or secondary blades. See FIGS. 10, 11 and 12.

Figure 10:
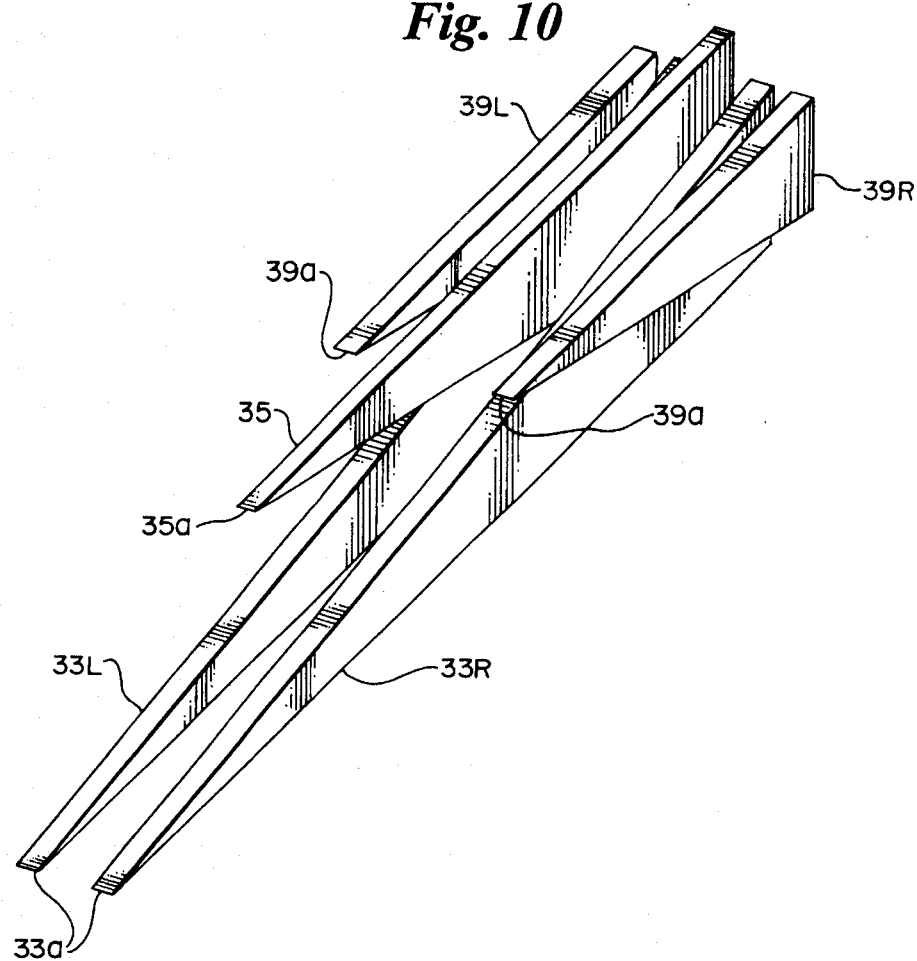
FIGS. 10 and 11 illustrate a five melt-blade configuration in perspective and side-elevation, respectively and best illustrate the concept/features of "longitudinal blade staggering".
Figure 11:
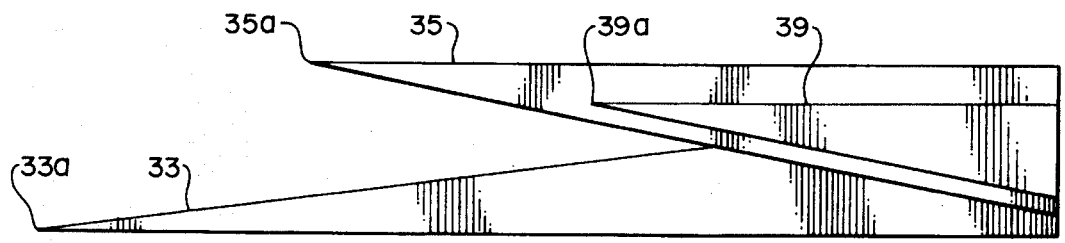

All blades first protrude into the melting chamber from locations referred to as "first acuity points". See FIGS. 3, 10 and 11. The first acuity point(s) 33a of the primary blade(s) 33 are in closest longitudinal proximity to the inlet port while the first acuity point(s) 35a of the secondary blade(s) 35 are substantially more distant from the inlet port. If tertiary blades are used then their acuity point(s) 39a would be more distant from the inlet port than either those from the primary or secondary blades. The differences in longitudinal placement of the acuity points is referred to herein as "blade stagger" or "longitudinal stagger" and can be seen in FIG. 3, and is best illustrated in FIGS. 10 and 11.

MELT HOUSING: Blade Geometry Preferred Values/Limits

The most important features in the overall melting blade design are:

(a) That not more than two melting blades have the same geometry, or, if more than two melting blades have substantially similar geometry that not more than two acuity points be longitudinally equidistant from the inlet port. This "longitudinal staggering" of the blades is important because it allows for a more sequentialized melting process especially during constant output conditions when new and relatively harder and colder material is being forced into and through the melting chamber. The benefit of this arrangement is that less force is thus required and the "stalling effect" is diminished.

(b) At least one blade must intersect, bisect and/or extend beyond the longitudinal centerline axis 31 of the melting chamber. This is critical because it ensures that the centermost portion of the thermoplastic material is both penetrated and bifurcated by a heated blade.

(c) The most-preferred blade thickness is approximately one-tenth (1/10) the mean diameter of the thermoplastic material and the gap between blades is also the same approximate value.

(d) The maximum height of the center blade must be equal to or greater than ½ the distance between any two opposing interior walls (exclusive of the blades themselves) of the melting chamber.

(e) The blades do not connect or intersect one another at any point within the melt chamber but remain substantially parallel to and between one another.

The dimensional geometry of the invention's melt housing and its integral features are substantially based upon the geometry of the material being melted. While most prior art defines this material as a generally cylindrical shaped rod, it is not the intention of this disclosure to limit its scope by that shape alone and any reference to cylindrical shaped material is intended for illustrative purposes only.

The following relational geometric guidelines illustrate this aspect of the invention.

"M" equals the average (or mean) distance between any two opposing points, sides or vertices on the cross-sectional shape of the material which is to be melted. (In simple terms, "M" would equal the diameter of a cylindrical thermoplastic rod material. In the examples of oval or elliptical cross-sectional material, "M" would equal the average of the minimum diameters with the maximum diameters thereof.)

Based upon the value of "M", the following general geometries are derived: Drawing reference numbers are used for "KEY" reference in the following Table; see also FIGS. 4, 5 and 7).

| DESCRIPTION | REF/ "KEY": | MOST PREFERRED VALUE/RANGE: |
|---|---|---|
| Overall length of melt housing | (8) | at least about 8 × M |
| Overall length of melt chamber | (20) | at least about 7 × M |
| Diameter of Chamber | | greater than about > M |
| Wall Thicknesses separating: | | |
| - Melt chamber and | | 20% M (+/−5%) |
| thermostat | | |
| - Melt chamber and heating means | | 20% M (+/−5%) |
| - Melt chamber and side (walls) | | 20% M (average, +/−10%) |
| Overall length of Primary Blade(s) | (33L)(33R) | at least about 6 × M |
| Overall length of Secondary Blade(s) | (35) | less than value of Primary blade |
| Average blade thickness (all blades) | | about 10% M (+/−2%) |
| Average gap or space between blades | | about 10% M (+/−2%) |
| Maximum blade height | | greater then about 50% M, up to maximum "M" |
| Blade:Gap:Blade:Gap: Blade distance in cross-section (See FIG. 7) | | about 50% M |

MELT HOUSING: Inlet Port Features

The primary function of the inlet port 22 is to provide a locating means or retaining area for the inlet tube and associated seals (if required). The internal cross-sectional size and shape of the inlet port is shown as illustrative in the Figures and should be slightly larger than but substantially resemble the cross-sectional perimeter of the thermoplastic rod material(s) being melted and dispensed through the invention.

The inlet port may either be integral to the melt housing or it may be a separate part which is joined to the melt housing. The principle advantages of having the inlet port integral to the melt housing are in reduced inventory, assembly steps, and there being less possibility of molten material leakage at a joint between the two elements.

However, there are distinct advantages to having the inlet port as a separate component which is joined to the melt-housing:

(1) It is not necessary that the inlet port be made of the same material as the melt housing. For example, improvement might be gained if the inlet port material were more thermally insulative than the melt housing.

(2) It would allow for a potential capability of more easily and cost effectively adapting the entire melting assembly for the purpose of melting material having different cross-sectional shapes or profiles.

As stated elsewhere alternative embodiments of the invention may utilize a supply of rod material having cross-sectional shapes which are non-cylindrical and may include polygonal cross-sectional material (i.e., triangular, square, pentagonal, hexagonal, etc.) or some other non-cylindrical shape. One prior art patent application (European Patent Application No. 90400216.9, Filed Jan. 24, 1990, Publication No. EPO 380 420 A2, Applicant/Inventor: Peter S. Melendy) ascribes the benefits and advantages (in both manufacture and use) of material having a substantially oval-shaped cross-section.

Figure 8:
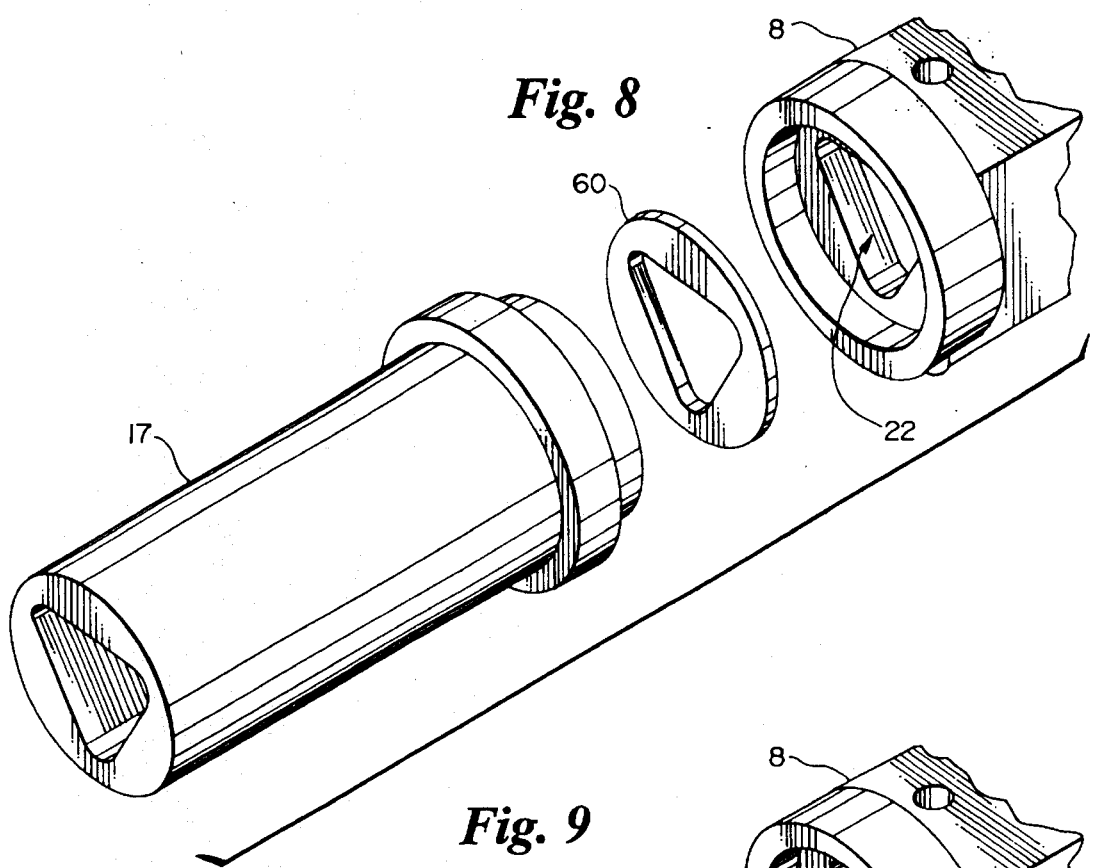
FIGS. 8 and 9 illustrate two alternative embodiments in exploded perspective view for using non-cylindrical thermoplastic materials (triangulated and quadrangulated).
Figure 9:
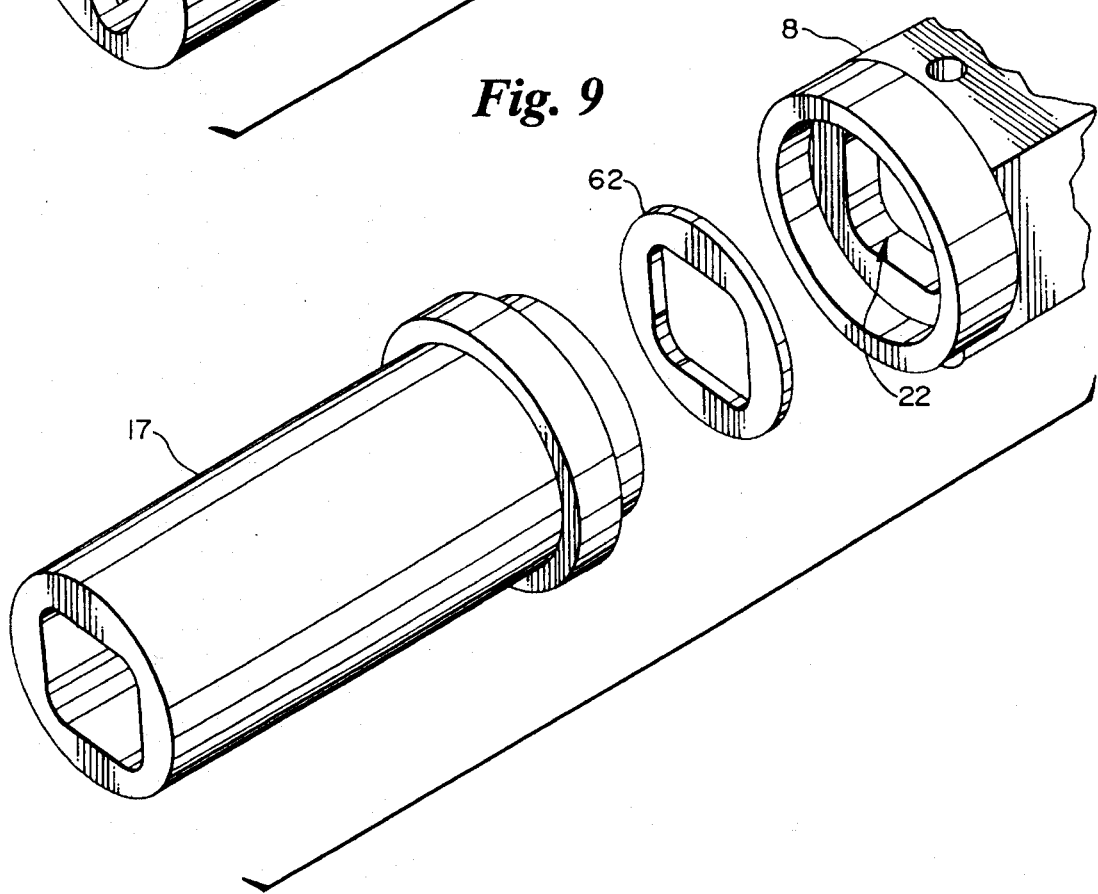

For illustrative purposes two alternative embodiments of the invention are shown herein in FIGS. 8 and 9: One example being a version having an inlet port shape for melting materials having a "triangulated" cross-section (FIG. 8): and the other, a version having an inlet port shape for melting materials having an "quadrangulated" cross-section (FIG. 9).

It is also important is that the invention's inlet port 22 easily be adapted to use (or have mounted to it) an inlet tube 17 fabricated from either a rigid material such as a ceramic or a more resilient material such as a silicone or Viton. Ceramic such as Steatite (L-4 or above) or aluminum silicate is preferred. Steatite is available from Superior Technical Ceramics Corporation of St. Albans, Vt. Aluminum silicate known as Duramic type M-120 is available from Wesqo/ Duramic of Palisades Park, N.J. The internal cross-sectional diameter of the inlet tube should be aligned with the internal cross-sectional diameter of the inlet port, and all should be slightly larger than but substantially resemble the cross-sectional size and shape of the thermoplastic rod material(s) being melted and dispensed.

TEMPERATURE CONTROL: Background

The temperature control method is important because it has to satisfy a diverse range of requirements including accuracy, adjustability, ease of calibration, reliability, electrical load or amperage draw, size, simplicity, serviceability, and cost.

Most thermoplastic materials have a preferred "application temperature" at which best results will be obtained. In the cases of thermoplastic adhesives for instance, the most preferred bonding characteristics and best overall results and performance will be obtained within a certain temperature range. It is important that the temperature control method maintains as close to that preferred application temperature range as possible. If not, and the temperature is too hot, then the material itself, the substrates being bonded by the material, and/or the application device dispensing the material could suffer performance problems or possible damage most likely caused by premature thermal degradation. If the temperature becomes too cold or substantially less than the preferred application temperature, then other problems are likely to occur. These include poor or inconsistent bonding of substrates, a difficulty in dispensing the materials due to viscosity fluctuations (with a corresponding fluctuation of material output) leading to, in many instances, the use of excessive force and possible damage to the application equipment to maintain consistent output.

Improved temperature control is especially important in "industrial use" or "constant use" applications where the frequency of use and relatively greater output of properly heated material(s) are required. This is a common theme which appears in much of the prior art. A good example of this is described in the "Background of the Invention" section of U.S. Pat. No. 4,637,745.

Over the years, various general methods of temperature control and regulation have been used: (1) Thermostats or thermostatic devices; (2) Self-regulating heating devices or P.T.C. (Positive Temperature Coefficient) elements; (3), Electronic circuit controlled methods including thermistors and/or thermocouple controllers; and (4), "Hybrid" systems consisting of a combination of methods. Each general method may offer distinct advantages or disadvantages when compared with the other methods.

In the case of thermostats, prior art patents have only generally described the use of "a thermostat" or "thermostatic device", treating them essentially as generic items but failing to distinguish between the different types, advantages of their specific construction, their location, or their capability of being adjusted to specific temperatures. The use of thermostats is generally the oldest and therefore perhaps the "most conventional" method of temperature control shown in prior art. It remains a preferred method of temperature control in most of the "industrial" hand-held application equipment.

In the early 1980's, the introduction and use of P.T.C. (Positive Temperature Coefficient) self-regulating heating elements in adhesive applicators changed the marketplace. These elements are variable wattage devices made of a patented "doped ceramic" material and when voltage is applied they heat up to and stabilize at a specific temperature. Essentially, they promised high accuracy at low cost because they eliminated the need for a separate thermostat and the associated calibration, wiring and assembly steps. Most also have a distinct advantage of being able to operate at any voltage between 100–240 volts AC. These P.T.C. elements are used in almost all of the low-cost adhesive applicators ("glue guns") in the consumer, craft/floral, hardware and hobby markets.

Unfortunately, P.T.C. elements suffer significant shortcomings: They are non-adjustable, fixed-temperature devices; they have limitations on their potential wattage capability or "watt density"; despite being variable wattage devices, their "peak" wattage usually occurs at or below 50% of their temperature setpoint; and perhaps most significantly they have very "slow" thermal response. By this it is meant that they require substantially longer warm-up times and "recovery" times, requiring 200% to 400% more time to heat up or reheat when compared with equivalently rated heater/thermostat systems. A typical single element P.T.C. glue gun requires from 6 to 8 minutes or more to warm up to its setpoint temperature. In terms of melting adhesives, P.T.C. heated devices maintain thermal accuracy only after they have stabilized at their setpoint temperature and no material is flowing through them. In other words, "they are only accurate when they are not being used". Otherwise they tend to cool down fairly rapidly and take a substantial amount of time to recover to the original setpoint temperature. As such, they would perform best in "intermittent use" applications.

The thermal "slowness" of P.T.C.'s has been addressed in different ways. One example is the use of multiple P.T.C.'s as shown in U.S. Pat. No. 4,637,745, which describes the use of three such heating elements.

P.T.C. devices are sometimes combined with thermostats in a "hybrid" system. One good example was Adtech's commercial embodiment "Cool Melt" glue gun which used a thermostatically controlled P.T.C. to maintain the applicator's temperature in a 200° to 280° F. range.

Another example of a hybrid system would be a "dual-melt" applicator in which the temperature of the applicator can be switched between a 350°–380° F. (P.T.C. alone) range or a 200°–250° F. (thermostatically controlled P.T.C.) range. Such devices have appeared in the marketplace.

An electronically controlled hot melt adhesive temperature regulating system is found in U.S. Pat. No. 4,059,204, which describes an electronic and electrical system having the ability to compensate for the undesirable temperature drop which occurs when thermoplastic material or hot melt adhesive is flowing through a melting assembly. The temperature compensating circuitry described is complicated, potentially unreliable and expensive for the rugged use, abuse or tough environmental conditions which it would be exposed to in the industrial marketplace.

Other examples of electronically controlled temperature regulating means are found in the 3M Model Polygun "HP" and the Dexter-Hysol Model 2000. Both applicators use thermistor devices in conjunction with either an external control module (3M "HP" Applicator) or internal, "on-board" circuitry (Hysol 2000). 3M's external controller has a system of switchable settings so an operator can select one (of seven total, but only four recommended usable) temperature ranges. The location of the thermistor sensor is detrimental to the overall design, located in too close proximity to the heaters and on the same side of the melting chamber. The Hysol 2000 system's thermistor sensor, while being very accurate, could have been better situated, and the overall thermal performance indicated insufficient wattage and poor homogenization of molten material. In addition, adjustability on the Hysol 2000 is overly sensitive with very small adjustment increments resulting in substantially large temperature changes, and there are no "stops" to limit the amount of adjustment. The temperature controlling methods used in both applicators are more costly and offer degraded performance compared to the simpler method proposed herein.

In recent years new thermoplastic adhesive products have been developed and introduced which are specifically formulated to operate in hand-held applicators at temperature ranges significantly below the 350°–400° F. range shown in most of the prior art. Specific examples of this would include U.S. Pat. No. 5,041,482 (Ornsteen et al) dated Aug. 20, 1991, for "Cool Melt Glue"; and the non-patented introduction of "Low-Melt" adhesives and applicators by 3M Company. H. B. Fuller has developed several adhesives which are designed to operate in a wide temperature range including both "cool melt" and "hot melt" ranges.

With the advent of new thermoplastic products designed for operation at specific temperature ranges, the issue of temperature adjustability has increased in importance. While many prior art applicators have had some capability for temperature adjustment, the potential was never fully exploited.

The temperature controlling system proposed herein offers the best performance in terms of simplicity, accuracy, adjustability and low cost. With this in mind, the "most preferred" embodiment of this invention will now be described with respect to temperature control.

THERMOSTATIC DEVICE

This part of the disclosure describes the use of a specific type or class of thermostatic device known as an "expansion" type or "conduction" thermostat. It is currently available in two forms: either a "surface mount(ed)" type, or in a cylindrical cartridge form. This disclosure focuses on the first type, namely the "surface mount conduction thermostat" as being preferred. It operates in accordance with principles first described in U.S. Pat. No. 2,389,686, dated Nov. 27, 1945, to F. Reingruber et al.

Such controls are commercially available for example from Bilbee Controls, Inc., P.O. Box 900 Cairo, N.Y. 12413, as Model B-200 Conduction Type Thermostat or from Kidde-Fenwal, Inc., 400 Main Street, Ashland, Mass. 01721, as model Series 3000 Surface Mounting Thermostatic Temperature Controllers.

This type of thermostat was selected as a most preferred method of temperature control for the prototype embodiments of this invention and the first commercial embodiment(s) of the invention because it better satisfies the wide range of requirements stated above: Accuracy, adjustability, availability, ease of calibration, reliability, electrical load or amperage draw, size, simplicity, serviceability, and cost.

In the conduction thermostat the principal temperature sensing component is made from a single-metal element (sometimes the baseplate or the outer case) which, when heated, expands more rapidly than other internal components and thereby produces the necessary mechanical switching action to open (or close) an electrical circuit. This type of action is more sensitive to temperature fluctuations and therefore more accurate than the commonly used "bimetallic" or "snap disc" thermostats which rely upon the use of a two-metal temperature sensing element. In many cases the latter type may seem more commercially feasible because of their relatively compact size, but overall accuracy and reliability are compromised. Inherent in the design of "bimetallic" units is the requirement of a sizable temperature differential for proper and reliable operation. It is usually specified as a "contacts open" and/or "contacts close" temperature with each having an additional manufacturer's tolerance. Therefore, it is quite common to have a real accuracy or minimum differential of 25° F. or more between the opening and closing of the electrical circuit supplying heat to the thermoplastic dispensing device. Using the preferred "conduction-type" thermostat, however, there is essentially only one set-point and the switching accuracy or temperature differential can be as little as ±2° F. depending upon the heating method and component location.

In practical terms, if there is sufficient heating wattage provided and all components are properly located, as soon as the flow for thermoplastic material through the melting assembly reduces its operating temperature the heating circuit will activate immediately to maintain the preferred melting characteristics of that material and the invention is capable of more consistent melting of thermoplastic material at preferred temperatures over a consecutively longer period. This improvement in melting performance is especially true when compared with other melting devices using bimetallic snap-disc thermostats, or self-temperature-regulating type P.T.C. (Positive Temperature Coefficient) heating devices.

Important critical improvements of this aspect to the invention are shown in FIG. 2 and include the stop post 52, and the stop collar 53 to limit the amount of adjustment at specified minimum 53 Low and maximum 53 High temperature settings (See FIGS. 2 and 6). The method of thermostat attachment is "non-critical" as long as the device is mounted according to the manufacturer's recommendations. One method is shown in the illustrations which provides good heat exchange between thermostat 34 and housing 8 for control purposes.

HEATING MEANS

The heating means 30 (best seen in FIGS. 1, 2 and 6) preferably uses a standard "sheath type resistance wound" cartridge shaped heaters. These heaters are available from many manufacturers in a variety of materials, dimensions and electrical properties. One example is the Superwatt Cartridge Heater available from HOTWATT, Inc., 128 Maple Street, Danvers, Mass. 01923. There is a measurable amount of latitude available to a designer in determining an optimum relationship between the heating means (heater), the temperature control means, their respective location(s), the thermal mass of the melt housing which contains the melting chamber, the rheology of the material to be melted, the planned life expectancy of the various components, and overall system performance.

Figure 7:
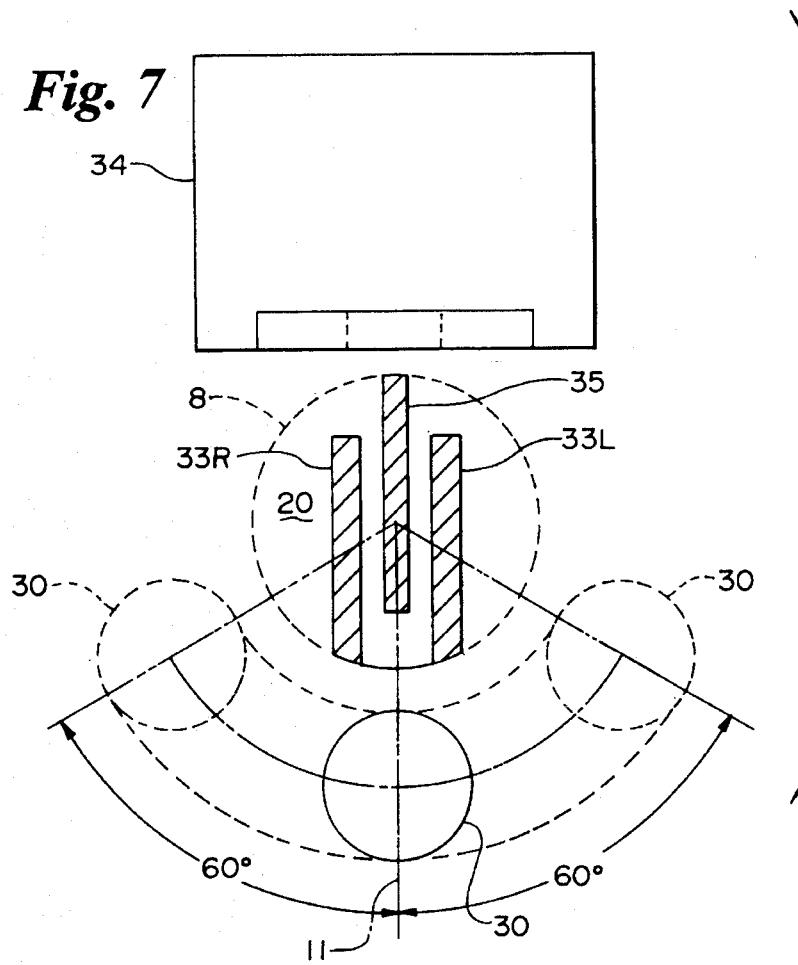
FIG. 7 illustrates various heater element locations in a diagrammatic schematic.

The electrical circuit schematic is fairly simple as shown in FIG. 7. The thermal fuse 58 and related splice connectors 59 are non-critical to the invention's performance but are illustrated because they would be preferred safety components on a commercial version to comply with regulatory requirements and the like.

Therefore, overall heating performance of the invention was developed (and refined through testing) to achieve the following preferred characteristics:

(1) The melting assembly should, in a preferred configuration, reach full operating temperature within three minutes (180 seconds) from being first energized (i.e., plugged in and/or switched on); and in a most preferred embodiment, in 150 seconds or less:

(2) That, after any duration of dispensing, the device should recover to its original setpoint temperature in less than 75 seconds, this characteristic being known as "recovery time";

(3) That in its most preferred configuration only a single cartridge heating element is necessary to achieve the first two conditions, and testing to date has shown that a minimum of 200 Watts at 120 Volts AC, 60 cycles would be required to achieve preferred performance with 11–12 mm diameter cylindrical material. A single element is also preferred for simplicity of overall design, fabrication and servicing.

It is "non-critical" whether the heater lead wires 46, 47 are located or oriented at the front or the rear of the heater bore 28. The heater element 30 should be installed and properly toleranced to the heater bore 28 in accordance with manufacturer's recommendations. An acceptable alternative embodiment ("less preferred") would have one or more heating devices located within 60 degrees of arc on either side of the vertical centerline 11 as shown in FIG. 7. This would allow for the use of multiple heating devices, or an "off-center", single heater if so required.

COMPONENT ORIENTATION

Figure 4:
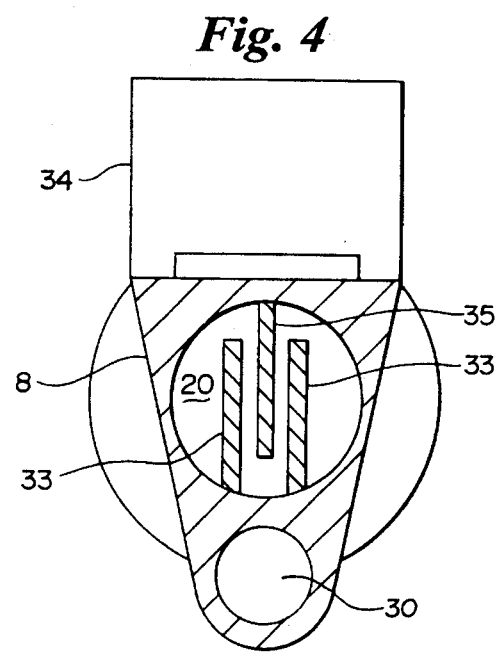
FIG. 4 is a cross-sectional view of the invention taken at line 4—4 in FIG. 2, showing a preferred orientation of the invention's components.
Figure 5:
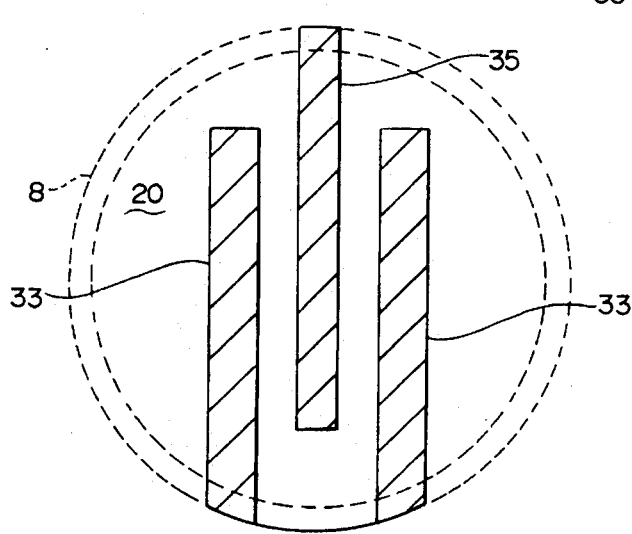
FIG. 5 is an enlarged sectional detail of a portion of FIG. 4 illustrating the preferred cross-sectional geometric relationship of the invention's melting-blade features.

In simple terms, the preferred embodiment is arranged as follows: The melting chamber 20 within its associated melting blade elements must be located between the heating means 30 and the conduction-type thermostat 34, and preferably along the same vertical centerline 11 when viewed in cross-section. This is best illustrated in FIGS. 4, 5 and 7.

In what is presently believed to be the most preferred embodiment of the invention, the single heating element 30 and one or two of the longest "primary" melting blades 33L and/or 33R are located substantially adjacent at one side of the melting chamber 20, while the surface-mounted conduction type thermostat 34 and one or more of the "secondary" melting blades 35 are located substantially adjacent to or along the opposite side (or face) of the melting chamber (lower and upper sides respectively as shown).

This orientation makes best advantage of the interaction between the individual components especially when considering the thermoplastic material(s) having thermally insulative properties while the invention's melt housing is thermally conductive. Therefore, during static load conditions (when the melt housing is at its proper "idling" temperature but no material is flowing through) the heat passes through the conductive melt housing readily and is controlled by the thermostat; while during dynamic load conditions (when material is flowing through the melt housing) more heat is directly absorbed by the relatively cooler thermoplastic material and the flow of this material acts as a temperature controlling means. Under dynamic load conditions the thermostat can remain inactive (in the "on" position) until such time as the flow of material is reduced, interrupted, or ceased.

Figure 12:
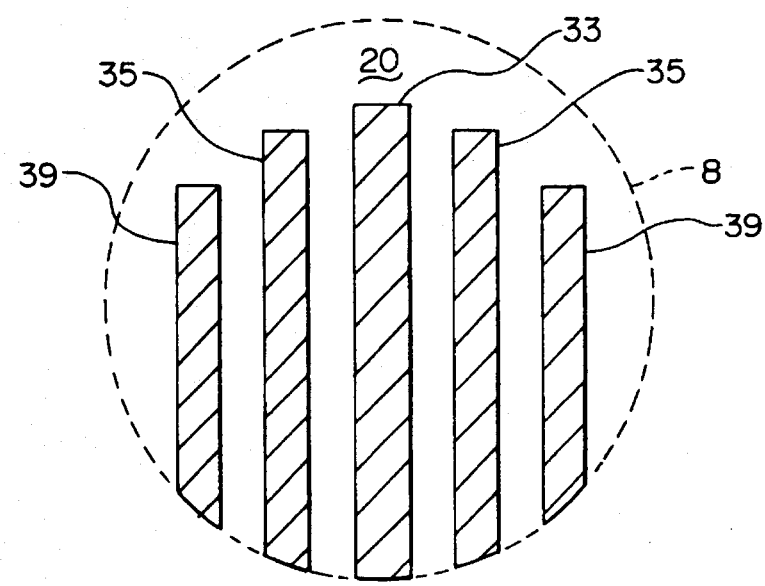
FIGS. 12 and 13 illustrate alternate embodiments in section of melting blade configurations with all blades on the same side of the melt chamber.
Figure 13:
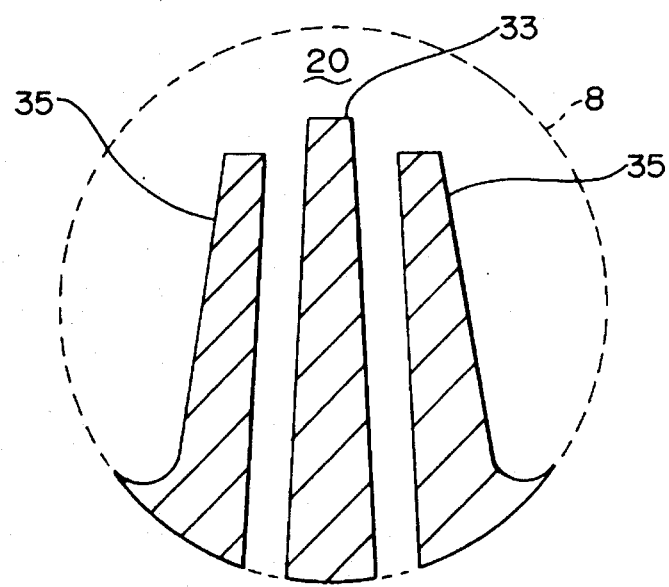

As seen in FIGS. 12 and 13 other blade arrangements may be used in which the blades are positioned on the same side of the chamber (in this case the bottom side).

OPERATION

The preformed thermoplastic material, which may be in a solid or semi-solid physical state, is introduced (typically in the form of a rod 15) via the use of some externally applied force through the feed or inlet tube 17 into the inlet opening 22 of a melting chamber 20 which is an integral feature of the melt housing 8. Upon entering the melting chamber, the material then passes a small distance before its first contacts the "first acuity" point(s) 33a of one or more of the primary heating blades 33L, 33R. These blades increase in height as they extend into the melting chamber, thereby cutting and melting progressively deeper into the thermoplastic, essentially bifurcating (at the least) or trifurcating (at the most) the material into a plurality of streams as the material moves over the blades. After another small distance forward, the opposite side of the material first contacts the first acuity point 35a of the secondary blade or blades 35 which further bifurcate or trifurcate the material into more substreams.

As soon as the loss of heat from the melt housing into the relatively cooler material is below the setpoint of the thermostatic devices 34, the thermostat almost immediately switches on the heating element 30 thereby supplying more heat to the primary blades 33L, 33R where, because of their proximity to the heater, the heat is better focused or directed into the centermost section(s) of newer material as it is introduced into and through the melt chamber. If the flow of thermoplastic material through the melt chamber is sufficiently large, the heating element constantly remains energized supplying a steady level of heat to the material. In an ideal configuration the wattage of the heater(s) should be sufficient enough so that under these prescribed "constant output" conditions, the overall temperature of the system will increase without quite attaining the thermostat's "setpoint" temperature until such time as the flow of thermoplastic material is significantly reduced, interrupted or ceased altogether.

The molten material then exits the melt housing chamber through its outlet 24 usually into and through some form of attached or inserted nozzle assembly 12. The flow of material through the melting assembly will stop when the externally applied force ceases.

FIG. 8 suggests an alternate embodiment "triangulated" system, and FIG. 9 suggests an alternate embodiment "quadrangulated" system by virtue of the specially shaped seals and inlet ports 60, 62 and 27, respectively whereby different shaped glue sticks or rods may be accommodated. These are respectively inserted between inlet tube 17 and housing 8 and their related inner configurations.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is as follows:

1. In an apparatus for melting and dispensing thermoplastic material comprising a thermally conductive melting chamber having inlet and outlet means, by means of which the material can be passed through the chamber to melt and dispense same, the chamber having associated therewith means for heating the chamber and temperature control means for controlling the temperature of the chamber, the improvement comprising: a plurality of fixed, heat-conducting blades, the blades being spaced from one another, substantially parallel with respect to each other and protruding into the chamber from a side wall thereof, the blades further being situated in the chamber longitudinally thereof whereby the blades progressively slice and melt the thermoplastic material as it moves through the chamber from the inlet means to the outlet means.

2. The apparatus of claim 1 wherein the blades are generally triangular shaped, having small and relatively large ends with the small ends nearer the chamber inlet means such that the blades progressively increase in height and protrude further into the chamber as they approach the chamber outlet means.

3. In an apparatus for melting and dispensing a body of thermoplastic material comprising a thermally conductive melting chamber having inlet and outlet means, by means of which the material can be passed through the chamber to melt and dispense same, the chamber having associated therewith means for heating the chamber and temperature control means for controlling the temperature of the chamber, the improvement comprising: a plurality of fixed free-standing, generally triangular shaped, having small and relatively large ends, and heat-conducting blades, the blades being spaced from one another, substantially parallel with respect to each other and protruding into the chamber from a side wall thereof, the blades being situated in the chamber longitudinally along and parallel to the axis thereof with the small ends nearer the chamber inlet means such that the blades progressively increase in height and protrude further into the chamber as they approach the chamber outlet means whereby the blades progressively slice and melt the thermoplastic material as it moves through the chamber from the inlet means to the outlet means, and wherein one blade of the plurality is positioned so as to extend along the longitudinally centerline axis of the chamber and no more than two blades of the plurality fare closest to the inlet, the balance of the blades being staggered positionwise with respect to the inlet means so as to be further therefrom than the first two mentioned blades.

4. The apparatus of claim 3 wherein the plurality of blades include at least two types, one type being the longest and being associated closely with the "heating means", the second type being relatively shorter and associated closely with the temperature control means.

5. The apparatus according the claim 4 wherein there are at least one blade of the first type and one of the second type.

6. The apparatus according to the claim 4 wherein there is included a third type of blade which is the shortest of all.

7. The apparatus according to claim 3 wherein the thickness of the blades is about $1/10$ the mean diameter of the body of thermoplastic material being melted.

8. The apparatus according to claim 3 wherein the spacing between the blades is at least about $1/10$ the mean cross-sectional diameter of the body of thermoplastic material being melted.

9. The apparatus according to claim 3 wherein the maximum blade height of a center blade is at least about equal to $1/2$ the distance between any two opposing wall portions of the body of thermoplastic material being melted.

10. The apparatus according to claim 3 wherein the temperature control means is of the conduction type.

11. The apparatus according to claim 10 wherein the temperature control means is of the surface mounted type.

12. The apparatus according to claim 10 wherein the temperature control means is of the cartridge type.

13. The apparatus according to claim 10 wherein the temperature control means includes maximum and minimum stop means whereby the adjustment of the control is limited.

14. The apparatus according to claim 3 wherein the heating means is one or more sheath type resistance wound cartridge shaped heaters located within a 60° arc on either side of the vertical centerline of the melt chamber.

15. The apparatus according to claim 4 wherein the heating means is located below the melt chamber within a 60° arc on either side of the vertical centerline of the melt chamber the temperature control means is substantially on the centerline above the melt chamber and the plurality of blades consists of two primary blades of the first type protruding upwardly from the bottom of the chamber and a single blade of the second type protruding downwardly from the top of the chamber along the centerline.

16. The apparatus of claim 1 including ceramic means defining an inlet area to the melt chamber.

* * * * *

UNITED STATES PATENT AND TRADEMARK OFFICE
CERTIFICATE OF CORRECTION

PATENT NO. : 5,462,206
DATED : Oct. 31, 1995
INVENTOR(S) : Jon B. Kwasie It is certified that error appears in the above-identified patent and that said Letters Patent is hereby corrected as shown below:

Title page, item [56] under "OTHER PUBLICATIONS", line 4, delete the first N.Y. and insert --Cairo --;

Fig. 2, reference numeral "50" should be deleted, insert therefor -- 30 --;

Col. 2, line 41 through 48, should not be indented in its entirety;

Col. 11, line 9, delete "Wesqo" and insert -- Wesgo --;

Col 14, line 28, delete "for" and insert -- of --;

Col. 16, line 28, delete "devices" and insert -- device --;

Col. 16, line 53, delete "27" and insert -- 22 --;

Signed and Sealed this

Twenty-third Day of April, 1996

Attest:

BRUCE LEHMAN

*Attesting Officer*     *Commissioner of Patents and Trademarks*